United States Patent
Heine et al.

(10) Patent No.: US 6,655,841 B1
(45) Date of Patent: Dec. 2, 2003

(54) CARTRIDGE STYLE FLUID DYNAMIC BEARING WITH CONICAL OR SPHERICAL BEARING ELEMENTS

(75) Inventors: Gunter Heine, Aptos, CA (US); Alan Lyndon Grantz, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/595,295

(22) Filed: Jun. 15, 2000

(51) Int. Cl.⁷ .............................................. F16C 32/06
(52) U.S. Cl. ...................................................... 384/110
(58) Field of Search ................................. 384/100, 110, 384/107, 112, 119, 124, 132

(56) References Cited

U.S. PATENT DOCUMENTS

| | | | | |
|---|---|---|---|---|
| 3,511,546 A | * | 5/1970 | Muijderman | 384/110 |
| 5,855,437 A | * | 1/1999 | Lee | 384/112 |
| 6,127,756 A | * | 10/2000 | Iwaki et al. | 384/110 |
| 6,144,523 A | * | 11/2000 | Murthy et al. | 384/110 |
| 6,154,339 A | * | 11/2000 | Grantz et al. | 384/110 |
| 6,181,039 B1 | * | 1/2001 | Kennedy et al. | 384/110 |

* cited by examiner

Primary Examiner—Thomas R. Hannon
(74) Attorney, Agent, or Firm—Moser, Petterson & Sheridan, LLP (57) ABSTRACT

A fluid dynamic bearing cartridge includes a shaft or sleeve adapted to be fixed in place has at least one fluid dynamic bearing supporting the shaft and one or more seals at either end of the shaft. The seal arrangements may include a pair of centrifugal capillary seals at either end of the shaft. Alternatively, a grooved pumping seal or centrifugal capillary seal at one end may be used in combination with a static capillary seal, especially where a journal bearing defined along the shaft near the capillary seal has an imbalanced groove section.

18 Claims, 9 Drawing Sheets

CARTRIDGE STYLE FLUID DYNAMIC BEARING WITH CONICAL OR SPHERICAL BEARING ELEMENTS

CROSS-REFERENCE TO RELATED APPLICATION

This application extends and modifies the principles taught in U.S. application Ser. No. 09/060,328 filed Apr. 14, 1998 (A-65481) and U.S. application Ser. No. 09/060,342 filed Apr. 14, 1998 (A-65485), assigned to the assignee of this invention and incorporated herein by reference.

FIELD OF THE INVENTION

The present invention is related to a fluid dynamic bearing incorporated into a cartridge.

BACKGROUND OF THE INVENTION

The stability and lifetime of a shaft and a sleeve and bearing assembly is of critical importance. One typical bearing assembly comprises ball bearings supported between a pair of races which allow relative rotation of the inner and outer pieces. However, ball bearing assemblies have many mechanical problems such as wear, run-out and manufacturing difficulties. Moreover, resistance to operating shock and vibration is poor, because of low damping. Thus, there has been a search for alternative bearing assemblies.

One alternative bearing design is a fluid dynamic bearing. In a fluid dynamic bearing, a lubricating fluid such as gas or a liquid or air provides a bearing surface between a fixed member and a rotating member or two relatively rotating members. Typical lubricants include oil or ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

As presently designed, fluid dynamic bearing motors seal the open end, whether it is just one end or both ends, using a capillary seal which simply comprises two relatively angled surfaces at the end of the gap with the seal being formed from one surface angled relative to the other. The problem with such conventional capillary seals is that they depend entirely on surface tension to maintain or draw fluid back into the motor. When used in pairs, as in a motor having an FDB which is open at both ends, such as a top cover attached motor, such a pair of capillary seals can be categorized as a pull-pull system; when there is more oil in one end than the other, the capillary seal with the lesser amount of oil pulls harder than the opposing capillary seal, and restores equilibrium. However, such capillary seals have been shown to be quite weak and have low volume. The problem with this low stiffness in a motor open at two ends is that only a small pressure imbalance in the motor can overcome the low seal stiffness, and cause oil to be lost with larger seal volume, the seal reservoir can store oil for equalization purposes.

Thus in designing cartridges incorporating a fluid dynamic bearing (FDB), especially a FDB open at both ends, this issue must be carefully accounted for.

SUMMARY OF THE INVENTION

The present invention provides a fluid dynamic bearing cartridge where the bearing is defined between two relatively rotating surfaces which are open to the air at both ends, thereby allowing the use of a fixed shaft or sleeve.

According to the design, a shaft or sleeve adapted to be fixed in place has at least one fluid dynamic bearing supporting the shaft and one or more seals at either end of the shaft. The seal arrangements may include a pair of centrifugal capillary seals at either end of the shaft. Alternatively, a grooved pumping seal or centrifugal capillary seal at one end may be used in combination with a static capillary seal, especially where a journal bearing defined along the shaft near the capillary seal has an imbalanced groove section.

Other features and advantages of the present invention would become apparent to a person of skill in the art who studies the present invention disclosure given with respect to the following figures.

DETAILED DESCRIPTION OF A PREFERRED EMBODIMENT

The present invention will next be described with respect to the following figures. This application will disclose in detail an embodiment of the capillary seal and grooved pumping seal utilized in the cartridges of this invention. Details of several of the structural elements which appear herein can also be found by referring to the cited co-pending patent applications which are incorporated herein by reference. The arrangement of one or more of these seals to support a shaft sleeve or cylinder, preferably in a balanced pressure environment in which the fluid is reliably contained within a cartridge, will then be described with reference to the following figures.

Figure 2:
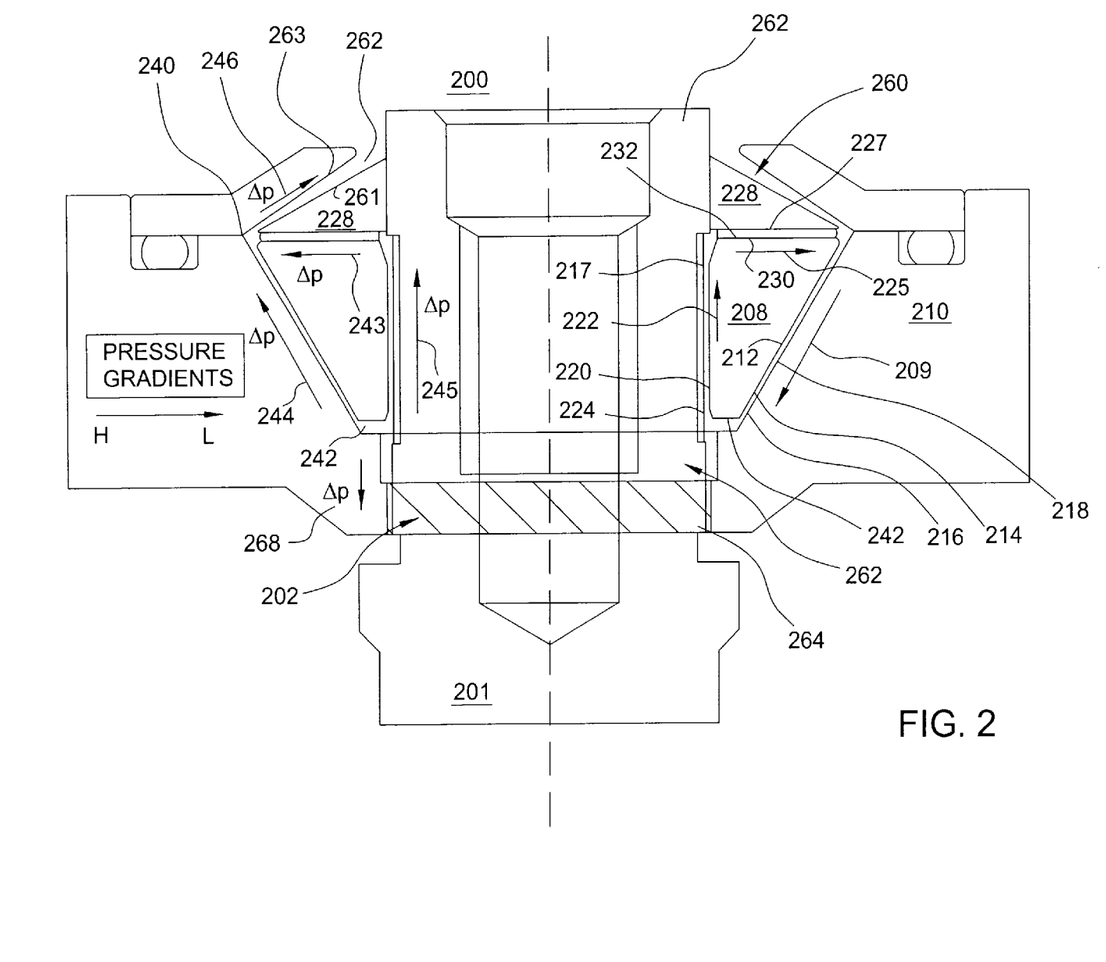
FIG. 2 is a verticial sectional view of a conical bearing shown in combination with both a centrifugal capillary and a grooved pumping seal, various combinations of which are shown supporting the shaft for rotation in succeeding figures.

Referring next to FIG. 2, the sealing designs shown in this figure provide a very positive sealing means for fluid dynamic bearing cartridges. The two seals are shown operating in combination; however, they may be used separately, in combination with certain other forms of hydrodynamic bearings. The centrifugal capillary seal generally indicated at 200 in FIG. 2 is especially used as a means for pushing fluid toward the fluid bearing when the motor is spinning and for holding the fluid in the gap when the motor is at rest as well as for allowing any fluid bubbles to escape; the grooved pumping seal generally indicated at 202 is especially used as a means for holding and sealing the fluid in the FDB. Each of the seal means also provides means for expelling any air bubbles which may enter the bearing system. The seals are illustrated in conjunction with a conical bearing. They can be used alone, or the seals can be used together without the intermediate bearing as will be explained with reference to the following figures.

Figure 1:
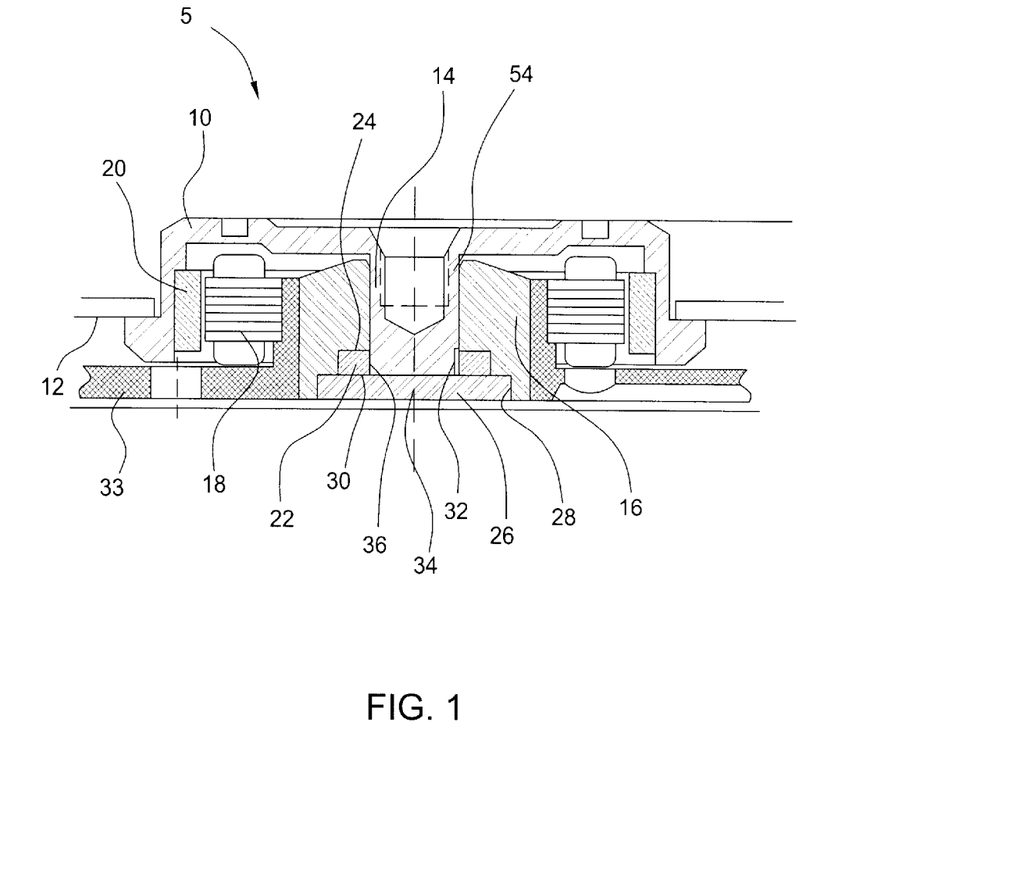
FIG. 1 is a vertical sectional view of a typical spindle motor for a disc drive in which the present invention is useful.

FIG. 1 is a vertical sectional view of a typical spindle motor 5 for a disc drive in which is useful with embodiments of the invention. Spindle motor 5 includes a stationary member 16, a hub 10, and a stator winding 18. Hub 10 is interconnected with the stationary member 16 through shaft 14 having a hydrodynamic bearing 34 for rotation about the stationary member 16. Hydrodynamic bearing 34 includes radial working surfaces 36, and 54 (e.g., journal surfaces). The hydrodynamic bearing 34 may include a series of hydrodynamic grooves 32 positioned thereon. The hydrodynamic grooves 32 may be disposed upon the shaft 14, and/or the stationary member 16 to facilitate the supply and distribution of the hydrodynamic fluid to the radial and axial working surfaces 36, 54, of the hydrodynamic bearing 34 from a hydrodynamic fluid supply channel 24 circumventing the shaft 14. A counterplate 26 having an axial working surface 30 (e.g., thrust surface) thereon provides axial stability for the hydrodynamic bearing 34 and to position the shaft 14 within spindle motor 5. The counterplate 26 further includes a sealing surface 28 adapted to prevent leakage of the hydrodynamic fluid. To provide support for the hub 10 and a disc pack 12 thereon, the counterplate 26 and stationary member 16 are disposed upon a body 33 of the spindle motor 5. A permanent magnet 20 is attached to the outer diameter of hub 10, which acts as a rotor for the spindle motor 5. Commutation pulses applied to the stator winding 18 generate a rotating magnetic field that communicates with rotor magnet 20 and causes hub 14 to rotate about the hydrodynamic bearing 34.

Continuing with FIG. 2, the primary support system is the bearing which comprises the bearing cone 608 and the surrounding bearing seat 610. The cone and seal define facing surfaces 612, 614 which are separated by gap 616 typically of about five microns (although this dimension is representative of example only; it may be greater or less depending on the tolerances achieved by parts and assembly methods). Fluid fills this gap 616, and is maintained under pressure within this gap during relative rotation of the facing surfaces, by grooves 618 on the surface of the bearing cone 608.

To allow for fluid circulation, and maintenance of the fluid in the gap 216, the gap is extended over the back surface 220 of the bearing cone 208 by providing fluid pathways 222 running linearly along the back surface of the cone or the facing surface 224 of the shaft. These pathways 222 allow the fluid to pass axially toward the distal end 226 of the shaft 500. The path or bearing gap for the fluid is completed through a gap (see arrow 225) between a wall 227 of the sealing cone 228 and the upper surface 230 of the bearing cone 208. Most efficiently, the path is through grooves 232 formed in the top surface 230 of the bearing cone 208. Most efficiently, the path is through grooves 232 formed in the top surface 230 of the cone 208, although the grooves could also be provided in the complementary surface of the seal cone 228.

As is shown by the arrows marked Δp on FIG. 2, the pumping action of the grooves 218 on the face of the cone 208 creates a pressure differential from the apex 240 of the bearing cone toward the narrower end 242 of the cone. The pressure gradients, indicated by the arrows 243, 244, and 245 labeled Δp, are from higher to lower pressure in the direction of the arrow. With the exception of the pumping sections, Δp and flow are in the same direction. Thus, the fluid flow over the surface of the cone being generally from the point of lower to higher pressure, is as marked by the arrow 244 and continues axially toward the distal end 226 of the shaft following the path marked by arrow 245 and returns to the apex of the cone (not shown) following the pressure arrow 243.

In order to provide a means for fluid to be inserted into the fluid dynamic bearing, as well as to provide a means for air bubbles to be expelled from the bearing 210, a centrifugal capillary seal 260 is incorporated into the design, leading from the open end 262 of the fixed shaft 500 and defined by the surface 261, 263 of relatively rotating parts, and leading down to the apex 240 of cone 208. Details of this design are found in the incorporated application. Basically, as disclosed, the centrifugal capillary seal 260 operates to continuously purge the FDB of any air which might inadvertently enter the system, while very effectively sealing the fluid within the bearing system.

In order to further enhance the sealing stiffness of the system, a grooved pumping seal 602 is provided, typically and preferably immediately axially inward from base 642 of the bearing cone, between the bearing cone and the central portion of the shaft where the stator is mounted. This grooved pumping seal 602, in a preferred form, can be defined on the face of a central section 669 of the bearing seat 610 which also supports one surface 614 of the fluid dynamic bearing. In a preferred form, this grooved pumping seal comprises an ungrooved surface section or quiet zone 662 surrounding a portion of the ungrooved shaft 501 immediately adjacent the base or narrow section 642 of the bearing cone, and a grooved pumping region 664 which also closely surrounds an ungrooved section of the shaft 501 immediately adjacent the quiet zone 662. This grooved pumping seal 602 is intended to be a low volume, very high stiffness seal. It is a capillary seal which employs active pumping by virtue of the presence of relatively deep grooves in one section 664 of the seal to provide very high seal stiffness. Seal stiffness is defined as the change in pressure developed across the seal divided by the axial length of fluid in the seal or Pa/mm (Psi/inch). As used herein, seal stiffness represents the seal's ability to retain fluid in the fluid dynamic bearing.

When the shaft is at rest, the oil settles into the groove annulus 264 but most of it a does not pass further down the shaft because of the capillary effect of diverging external annulus and the small radial gap between the shaft and rotating sleeve. When the motor spins up, the relative rotation of the shaft 500 and the surrounding section 264 of the grooved pumping seal create the pressure gradient indicated by the arrow Δp, 266. This causes oil or fluid to flow out of the grooves into the quiet zone 262 as indicated by the arrow 268. Further, because of this quiet zone 262, there is no pumping action to force the oil out of the quiet zone of the grooved pumping seal into the fluid dynamic bearing, so that the necessary fluid for effective operation of this grooved pumping seal is maintained. Any air bubbles which appear in the quiet zone would tend to e captured by the pressure gradients in the fluid dynamic bearing the be expelled from the distal end of the shaft through the centrifugal capillary seal; any further air bubbles which moved into the grooves of the grooved section 264 could be expelled into the interior section of the motor because of the strong pressure gradient created by the rotation of the grooved pumping seal.

Finally, it should be noted that the depth of the grooves and/or the width of the grooves diminishes as the oil is moved up through the grooved pumping zones 264 into the quiet zone 262. this enhances and provides a means for pumping the oil efficiently out of the grooves into the quiet zone during motor operation, while providing a strong capillary effect in the grooved region to maintain the oil in the grooved pumping seal 202 when the motor is not in operation.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the shaft could be left entirely smooth, and the grooves instead imposed upon the shaft.

Figure 3:
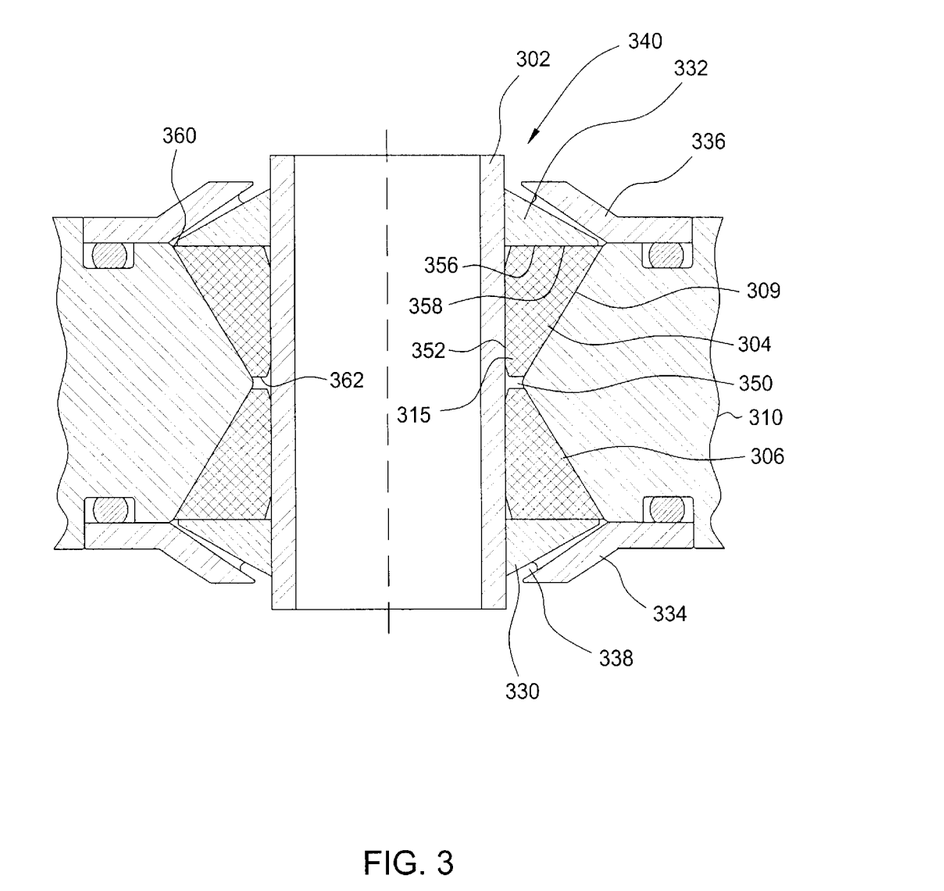
FIG. 3 is a vertical sectional view of a fluid dynamic bearing cartridge incorporating dual cones for supporting rotation of a shaft, used in combination with a centrifugal capillary seal.

The following figures will illustrate several different designs comprising single or dual cones used in combination with a centrifugal capillary seal or a grooved pumping seal which can be used to create a discrete fluid dynamic bearing cartridge. Thus for example referring next to FIG. 3, a cartridge is shown mounted on a sleeve 302 which may be incorporated into any design or press fitted or otherwise fastened to a shaft in a known motor design or the like. A sleeve 302 is supported for rotation over a pair of complementary cones 304, 306. A fluid-filled gap 309 separates the cones 304, 306 from the facing surface 315 of the sleeve 302; and the fluid which fills the gap functions as a bearing the supports the sleeve for rotation. The column 302 supports a cone 330 adjacent each of the bearing cones 304, 306. The cones 330, 332 each cooperate with a shield 334, 336 to form centrifugal capillary seals generally indicated at 338 and 340, respectively. These centrifugal capillary seals 338, 340 cooperate with the adjacent cone 304, 306 to maintain the fluid within the bearing gap so that fluid is not lost and the sleeve and bearing cones are properly supported for relative rotation. The operation of the centrifugal seals 338, 340 has been explained above. As is well known in this field, fluid fills both the gap between the cones 304, 306 and the surrounding sleeve 310. Fluid also fills the gap 350 between the cones, [and the fluid path is completed by a gap or other opening] between the cylinder or sleeve 302 and the inner axial surface 352 of each cone, as well as in a gap or channel which lies between the radially extending surface 356 of seal cone 332 and the facing radially extending surface 358 of the bearing cone 306. A similar path is found around all surfaces of opposite cone 304. In operation, where there is relative rotation between the sleeve 300 and the supporting bearings, bearing cones 304, 306, each conical bearing 304 or 306 is pulling lubricant away from the apex 360 of the centrifugal capillary seal in such a manner as to push it toward the narrow end 362 of the bearing cone 304, 306. This is achieved by putting appropriate grooves on one of the two facing surfaces of the bearing cone or surrounding sleeve to form, in cooperation with fluid, a fluid dynamic bearing. This pumping action overcomes the centrifugal force acting on the fluid in the bearing region which would otherwise push the fluid in the opposite direction, i.e. toward the apex 360 of the conical bearing and in turn into the gap of the associated capillary seal 340. This pumping action is very important in this bearing topology because some of the spinning fluid located in the bearing gap between the cone 304 and the sleeve 302 is located closer to the axis of rotation and is the fluid meniscus of the centrifugal capillary seal 340. Therefore, centrifugal force, if left to act by itself, would cause the fluid in the capillary seal to spin at the same minimum radius as that in the bearing. This would result in fluid being ejected from the capillary seal until the minimum radius in the seal and bearing were equal. As it is extremely important that the fluid levels in the bearing gap be maintained at all times, it is immediately evident that the balancing pumping action away from the apex 360 back down toward the narrow end 362 of the cone 304 is essential to the proper operation of the cartridge.

It should also be apparent that this cartridge, as well as the cartridges shown in the following figures, may be inverted for rotation in the opposite direction, that is either counter-clockwise or clockwise. One design facilitates and supports directions depending on the orientation of the installed cartridge; but once installed, the bearing in the cartridge can rotate in one direction only because of the orientation of the grooves on the one of the two facing surfaces.

Figure 4:
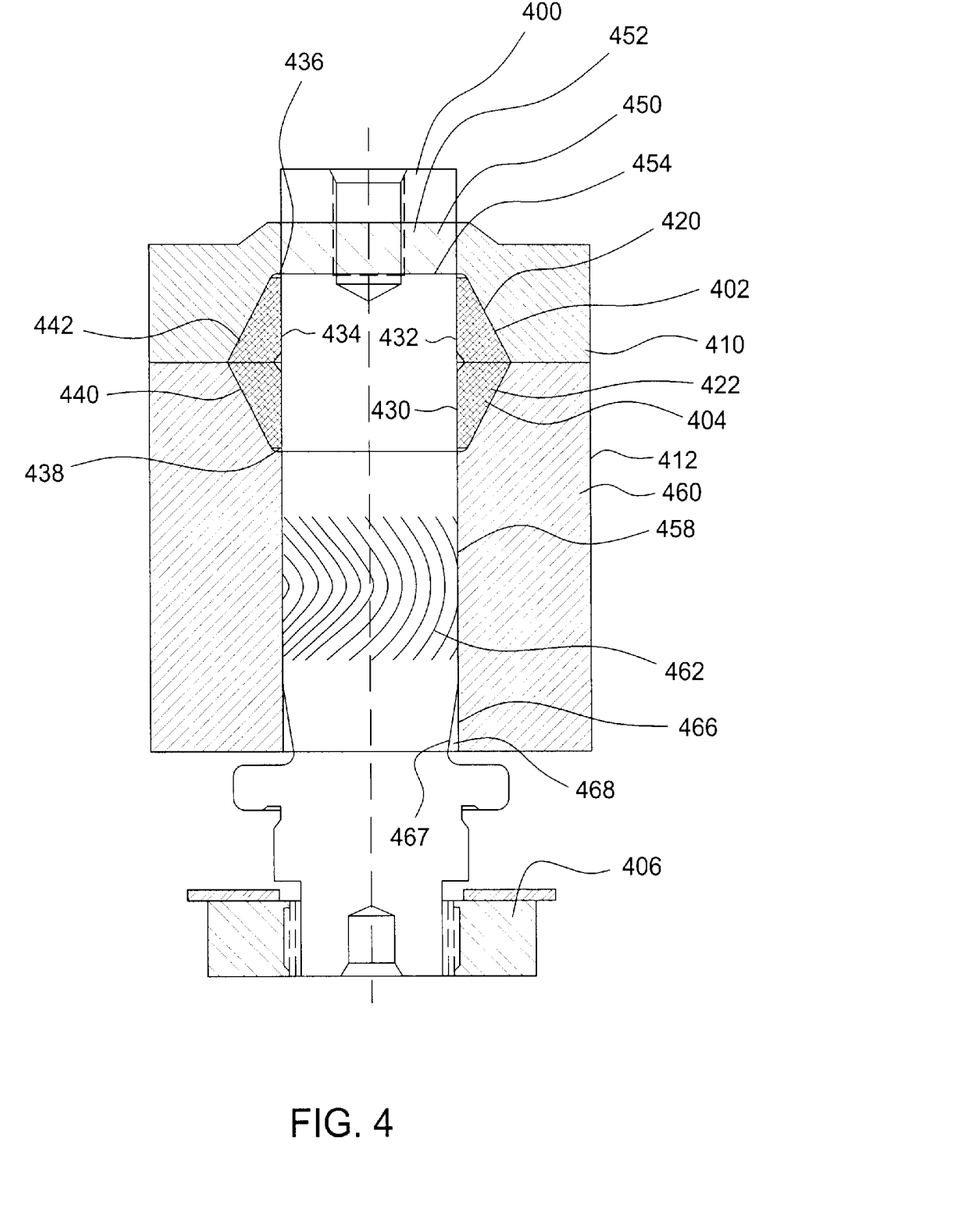
FIG. 4 is a vertical sectional view of a shaft utilizing two cones for supporting rotation of a sleeve around the shaft, the dual cone bearings being used in combination with a grooved pumping seal and a journal bearing.

Another embodiment is shown in FIG. 4 which utilizes dual conical bearings combined with a single grooved journal pumping seal on one side and an unbalanced journal bearing on the opposite side to maintain the fluid on the surface of the dual cone bearing.

Specifically, in the embodiment of FIG. 4 the shaft 400 supports a pair of cones 402, 404 each of which cooperates with a facing sleeve surface section to form a fluid dynamic bearing. The bearing is established by grooves either on the outer conical surface of the cone 402, 404 on the facing surface of the sleeve 410; the fluid is maintained and circulated over the surface of the cone by virtue of the pressures established by these grooves during relative rotation of the cones 402, 404 and the sleeve 410. To provide a complete circulation path for the fluid over the surfaces of the cone, grooves or other fluid circulation channels are provided between the wider ends of the cones at their facing surfaces 422, and the inner surfaces 430, 432 of the cones and the outer surface 434 of the shaft. It should be noted that in contrast to the design of FIG. 3, the design of FIG. 4 places the wider ends of the cones close together, and the narrow ends 436, 438 of the cones at the distal ends of the conical bearing. This makes pumping of the fluid over the surfaces of the cone and the maintenance of the fluid on these surfaces easier to support. Nevertheless, provision must be made for maintaining the fluid on the surface of the cone both while relative rotation between the sleeve 410 and the shaft 400 is occurring, and when the system is at rest. Therefore, the grooved pumping seal 450 is provided which comprises a section of the sleeve 420 surrounding the shaft and having grooves 452 on the inner surface thereof (although grooves may also be provided on the outer surface of the shaft) and a quiet region 454 between the grooved section of the grooved pumping seal and the end 436 of the cone. This establishes a pressure barrier so that fluid cannot leak away from the dual cones and out of the hydrodynamic bearing.

At the opposite, and typically lower end of the shaft, and along the longer section of the shaft, a journal bearing 458 is provided comprising grooves which are typically formed on the outer surface of the shaft, with the grooves 462 which are distant from the conical bearings being somewhat longer than the other half of the groove pattern 460. This establishes a pressure gradient along the shaft toward the conical bearing, so that during operation of the conical bearing, a pressure barrier is created which will prevent fluid from escaping either from the conical bearing or the journal bearing, while maintaining fluid in the journal bearing. When the system is at rest, the capillary seal 468 which is established by the relatively diverging walls 466, 467 at the ends of the sleeve section 412 and the shaft 400 prevents fluid loss. The distal end of the shaft can be supported within a motor frame or the like by a nut 406 which can be threaded or pressed onto the end of the shaft all as further shown in FIG. 5.

Figure 5:
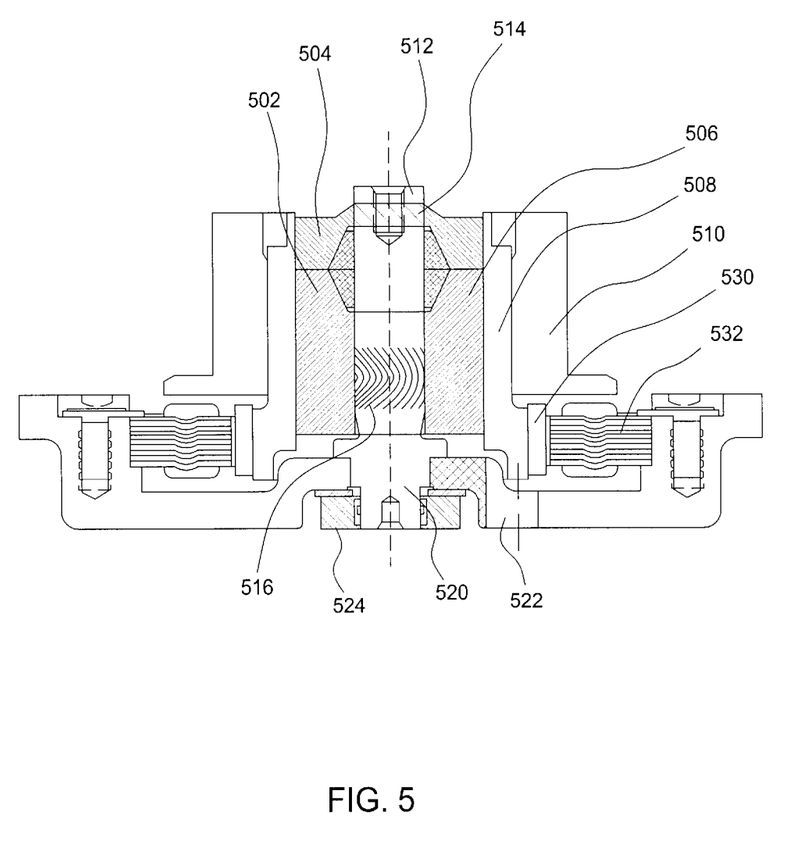
FIG. 5 is similar to FIG. 4 and shows the cartridge of FIG. 4 incorporated in a disc drive.

In FIG. 5, the dual conical bearing of FIG. 4 is shown integrated into a spindle motor for a disc drive. In this instance, the dual cones 502, 504 are again mounted on a shaft 512 and surrounded by a sleeve 506 which will rotate relative to the shaft. The sleeve supports a magnet support 508 and hub 510 for support of one or more discs. The grooved pumping seal 514 and unbalanced journal bearing 516 are provided on the upper and lower ends of the shaft as described above. The distal elongated end of the shaft 520 extends through the base 522 and is captured by a nut or the like 524.

Figure 6A:
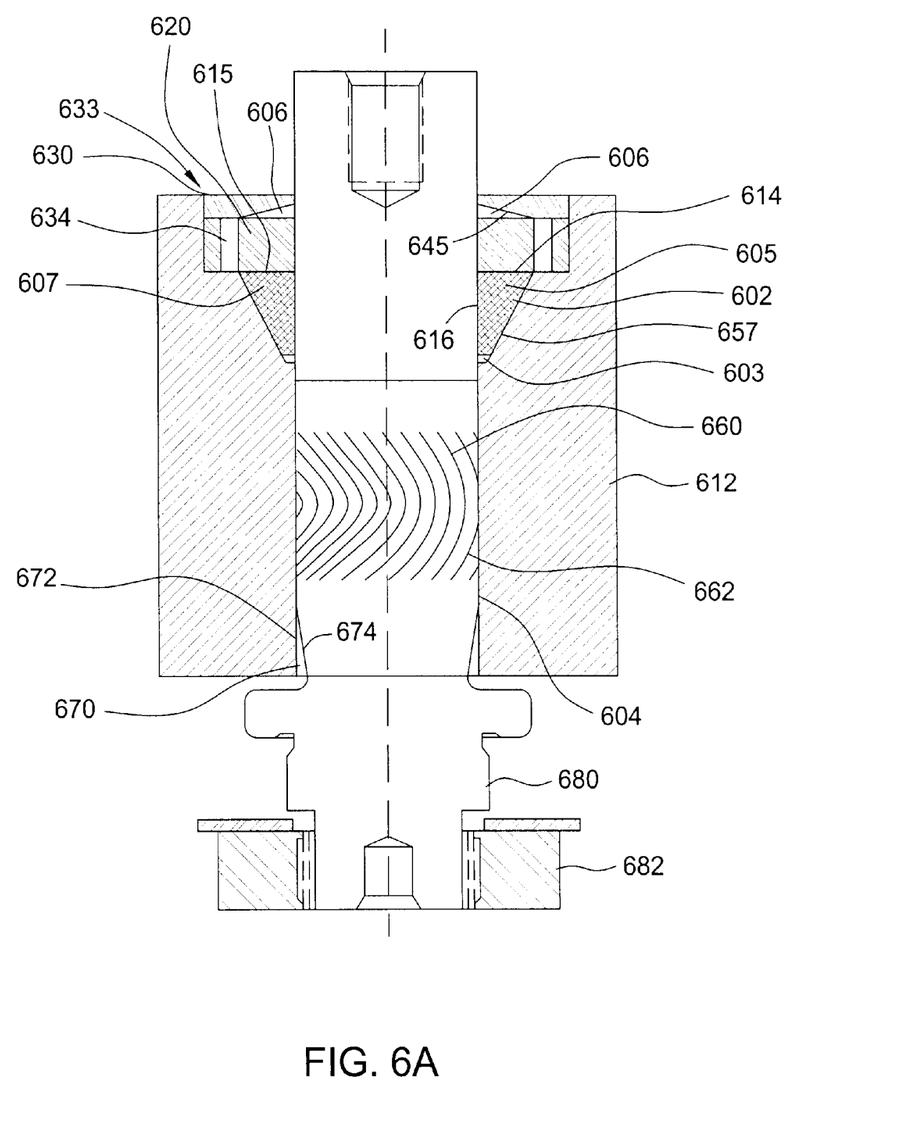
FIGS. 6A and 6B show a single cone cartridge used in combination with a centrifugal capillary seal and journal bearing to support a sleeve for rotation around a shaft or cylinder, respectively.

FIG. 6A illustrates a further alternative of the present invention wherein a single conical bearing is used in combination with a centrifugal capillary seal 606 and a journal bearing defined along a longer section of the shaft and on the opposite side of the conical bearing from the grooved pumping seal. The grooves 660 of the journal bearing are symmetrical, with the lengths of the grooves 662 more distant from the conical seal being longer to maintain the fluid over the conical bearing 602. A single cone 602 having its narrow end 603 at the point most distant from the centrifugal capillary seal 606 and its wider end 605 defining a radially extending surface 614 which is adjacent a counterplate 620 which defines a portion of the centrifugal capillary seal is mounted on the outer surface of the shaft 600. In accordance with the well-known operating principles of fluid dynamic bearings, fluid is maintained in the gap 607 between the conical surface of cone 602 and the facing surface of the sleeve 612 to support smooth relative rotation. To provide a complete fluid circulation path, a gap exists between the narrow part 603 of the cone 602 and the facing sleeve surface; between the inner surface of the cone 602 and the outer surface of the shaft 600; and between the radial surface 614 of the cone and the facing surface 615 of the counterplate 620 to support smooth relative rotation. These fluid passages may be defined either into the surface of the cone or the surface of the sleeve, or both. The counterplate 620 is supported by the sleeve 612 and rotates with it. The counterplate 620 supports on its upper surface a shield 633 which is generally conical in shape and defines a gap which extends from the oil passage 630 which extends axially through the counterplate from the end of the gap defined by the cone and sleeve to the narrowest part of the centrifugal capillary seal gap 606. The fluid passage 630 through the counterplate cooperates with the expanding gap 606 of the centrifugal capillary seal and the gap 607 between cone 602 and bearing seat or sleeve 612 to provide the necessary pressure balancing effect which is an important part of maintaining the fluid in the gap. It should be noted that the shield 633 which rotates with the counterplate 620 has one generally flat radially extending surface 643 so that the cartridge may be fitted into a housing or the like and an opposite partially angled surface 645 which defines the angularly extending gap as far as the fluid passages 630; beyond the bearing seat is substantially radial so that it rests flat against the counterplate and does not allow for any oil leakage.

On the opposite side of the conical seal, a journal bearing 604 is provided defined by sets of grooves 660, 662 which are greater in extent in the region 662 so that an unbalanced pressure effect graduated toward the conical bearing 602 is created. This unbalanced pressure helps maintain the fluid in the conical bearing and minimizes the chance of fluid loss.

Further down the longer portion of the shaft and typically on the lower portion of the shaft, a capillary seal 670 is provided defined by two diverging surfaces 672, 674. This capillary seal serves to trap any fluid which may escape beyond the journal bearing 604 and prevents its loss from the cartridge region.

As with the embodiment of FIG. 4, an extended portion 680 of the shaft 600 may be captured in the base of a housing or the like by a cooperating nut 682 which is fitted or screwed onto the lower extent of the shaft.

Figure 6B:
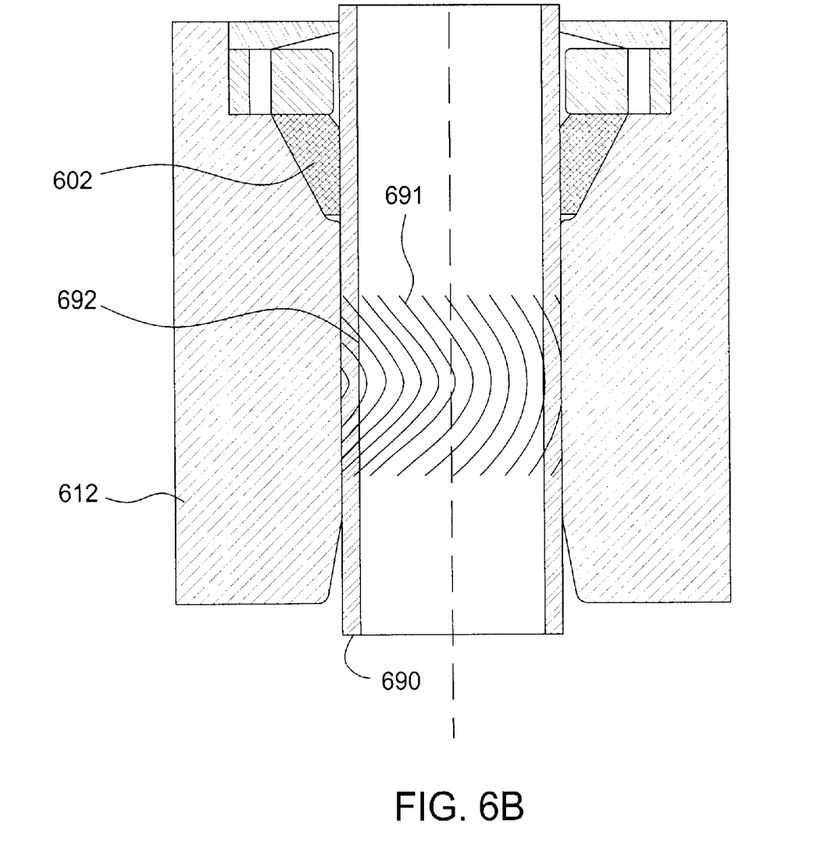

FIG. 6B shows a design substantially similar to FIG. 6A except that a sleeve or cylinder 690 is provided to support the interior region of the cone 602. As shown, the grooves 691 which form a part of the journal bearing 692 may be imposed either on the outer surface of the cylinder 690 or the inner surface of the bearing seat or sleeve 612.

Figure 7A:
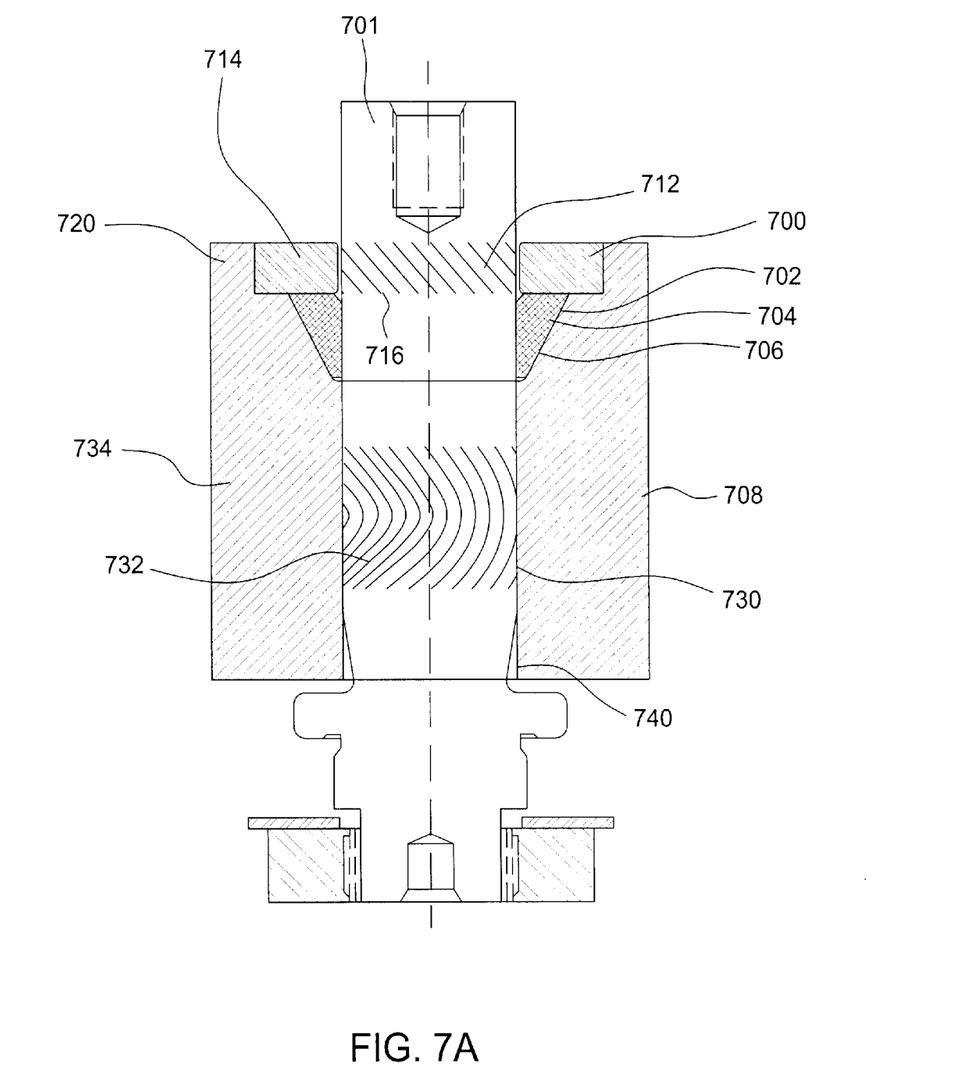
FIGS. 7A and 7B show a cartridge having a single cone bearing supporting a sleeve for rotation around a shaft used in combination with a grooved pumping seal and journal bearing, the cartridge being shown in combination with a shaft and a cylinder, respectively.
Figure 7B:
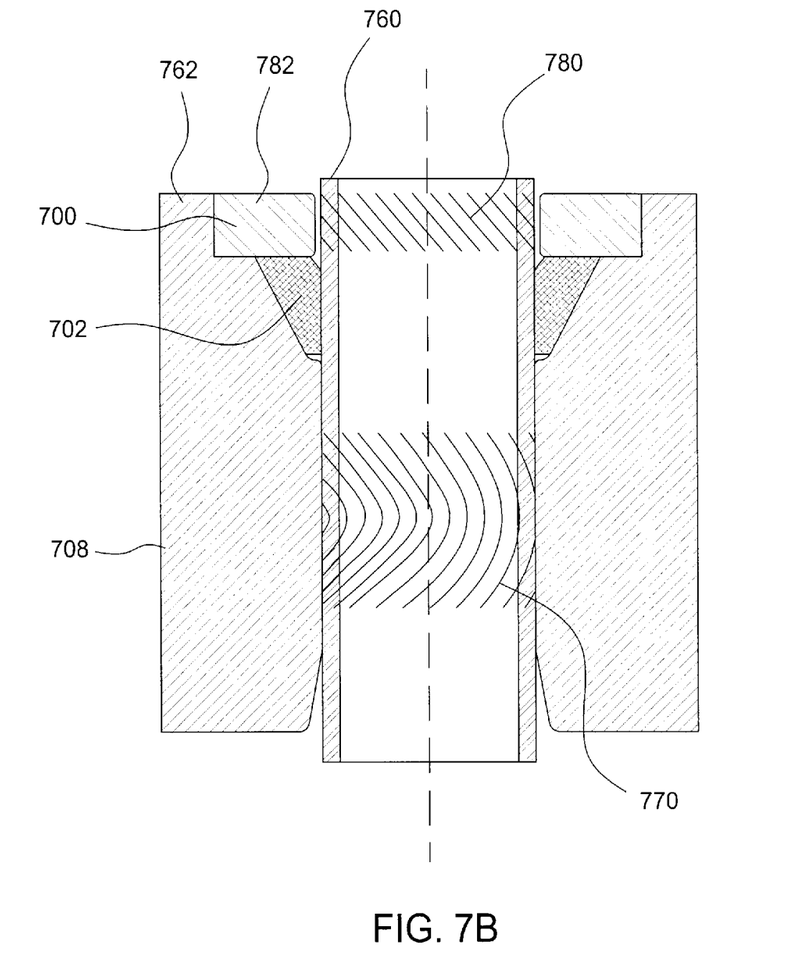

FIGS. 7A and 7B show a further alternative embodiment of the invention with many obvious operating similarities to the design of FIG. 6A and 6B. Looking first at FIG. 7A, the only substantial distinction is that rather than a centrifugal capillary seal, a grooved pumping seal 700 is provided adjacent the wiser end 702 of the conical bearing 704 to maintain the fluid in the gap 706 between the conical surface and the surrounding bearing seat of sleeve 708. The use of the grooved pumping seal 700, which is defined by a plurality of groves 712 which are preferably defined on the inner surface of the counterplate 714 adjacent an ungrooved portion or region 716 of the same counterplate, enforces a barrier adjacent the conical bearing 704 to prevent the. loss of any fluid. The counterplate is held in place adjacent the conical bearing 704, being supported between shoulders 720 of the combined sleeve/bearing seat.

On the opposite side of the conical bearing 704, on the longer end of the shaft, once again a journal bearing 730 is provided having unbalanced grooves 732 to provide a pressure differential in a direction of the arrow 734 to enforce a boundary condition so that fluid cannot escape from the conical bearing 704. On the opposite side of the journal bearing 730, a capillary seal 740 defined by diverging walls of the bearing seat and sleeve 708 and the shaft 701 is defined to prevent fluid escape.

Turning next to FIG. 7B, as with the previous embodiments, a cartridge may also be produced by mounting the conical bearing 704 and grooved pumping seal 700 on the cylinder or sleeve 760 and the shoulder 762 of the bearing seat and sleeve 708, respectively. As with the previous embodiments, the journal bearing grooves 770 are preferably impressed on the outer surface of the cylinder 760 while the grooved pumping seal grooves 780 are scored or otherwise impressed on the inner surface of the counterplate 782.

Other features and advantages of this invention will be apparent to a person skilled in the art who studies this invention disclosure.

What is claimed:

1. A discrete fluid dynamic bearing comprising a conical bearing for supporting relative rotation between a shaft and a sleeve, the conical bearing including a conical element supported on the shaft and having at least one passage between an interior surface of the conical element and a facing surface of the sleeve for allowing fluid flow, and a seal supported adjacent the cone and a journal bearing defined between the shaft and the sleeve.

2. A discrete bearing as claimed in claim 1 wherein the cone has a fluid flow path around all sides of the cone including between the base of the cone and the seal and between the inner surface of the sleeve and the outer surface of the cone.

3. A discrete bearing as claimed in claim 2 including a counterplate supported adjacent the cone to define at least one surface of the seal and a thrust bearing with the base of the cone.

4. A discrete bearing as claimed in claim 3 wherein a radially interior surface of the counterplate cooperates with a surface of the sleeve to define a grooved pumping seal having a net pressure directed toward the conical bearing.

5. A discrete bearing as claimed in claim 4 wherein one of the counterplate and sleeve have grooves on a facing surface, and wherein the grooved pumping seal further comprises fluid in a gap between the counterplate and the shaft.

6. A discrete bearing as claimed in claim 5 wherein the shaft comprises a hollow sleeve.

7. A discrete bearing as claimed in claim 6 wherein the shaft extends axially beyond the sleeve and is adapted to be fixed in a base member, the shaft thereby being fixed relative to the sleeve.

8. A discrete bearing as claimed in claim 4 wherein the shaft comprises a hollow sleeve.

9. A discrete bearing as claimed in claim 8 wherein the shaft extends axially beyond the sleeve and is adapted to be fixed in a base member, the shaft thereby being fixed relative to the sleeve.

10. A discrete bearing as claimed in claim 2 wherein the seal comprises a centrifugal capillary seal including a shield extending radially from said sleeve and supported from said sleeve, said shield including an angled surface extending axially radially toward the shaft, said angled surface cooperating with a radial surface of a counterplate supported by the shaft adjacent the cone to define a storage region for said centrifugal capillary seal.

11. A discrete bearing as claimed in claim 10 wherein the journal bearing on said shaft comprises a plurality of grooves formed in the sleeve and facing the shaft and fluid in the grooves to establish the journal bearing.

12. A discrete bearing as claimed in claim 10 wherein said counterplate includes an axial opening extending from a corner of the cone to an opening in the centrifugal capillary seal.

13. A discrete bearing as claimed in claim 12 wherein the shaft and sleeve further define said journal bearing axially displaced from the conical bearing on the distal side of the conical bearing from the counterplate.

14. A discrete bearing as claimed in claim 13 wherein the shaft extends axially beyond the sleeve and is adapted to be fixed in a base member, the shaft thereby being fixed relative to the sleeve.

15. A discrete bearing comprising fluid for supporting relative rotation between the sleeve and a surrounding hub, the bearing including a conical element supported on the sleeve and having passages between an interior surface of the conical element for maintaining fluid in a gap between the conical element and the hub supporting the relative rotation and sealing means supported adjacent the base surface of the cone, the sealing means comprising a counterplate supported adjacent the conical element; one of the counterplate and sleeve having grooves on a facing surface, and wherein the grooved pumping seal further comprises fluid in a gap between the counterplate and the shaft.

16. A discrete bearing as claimed in claim 15 wherein the shaft and sleeve further define a journal bearing axially displaced from the conical bearing on the distal side of the conical bearing from the counterplate.

17. A discrete bearing as claimed in claim 16 wherein the journal bearing comprises grooves formed on one of the shaft and sleeve, and fluid in the gap between the shaft and the sleeve to support relative rotation thereof.

18. A discrete bearing cartridge comprising a shaft or sleeve supported for rotation relative to a sleeve by first and second fluid dynamic bearings located along the shaft, said first fluid bearing comprising a cone on said shaft having a bearing surface defined between a conical side of said cone and a facing surface of the sleeve and further comprising a grooved pumping seal adjacent the cone and defined between a counterplate supported from the sleeve, and a journal bearing spaced along the shaft from the conical bearing and defined between the shaft and surrounding sleeve.

* * * * *